(12) United States Patent
Maghakian et al.

(10) Patent No.: US 8,823,962 B2
(45) Date of Patent: Sep. 2, 2014

(54) SMART MOBILE DEVICE HOLDER ON MULTIFUNCTION PRINTER

(71) Applicants: Emil Maghakian, Escondido, CA (US); Richard A. Murray, San Diego, CA (US); Juan Manuel Jimenez, Escondido, CA (US)

(72) Inventors: Emil Maghakian, Escondido, CA (US); Richard A. Murray, San Diego, CA (US); Juan Manuel Jimenez, Escondido, CA (US)

(73) Assignee: Eastman Kodak Company, Rochester, NY (US)

( * ) Notice: Subject to any disclaimer, the term of this patent is extended or adjusted under 35 U.S.C. 154(b) by 17 days.

(21) Appl. No.: 13/664,462

(22) Filed: Oct. 31, 2012

(65) Prior Publication Data

US 2014/0118764 A1    May 1, 2014

(51) Int. Cl.
*G06K 15/02*    (2006.01)
(52) U.S. Cl.
USPC ......................................... 358/1.13; 358/1.15
(58) Field of Classification Search
CPC ................................ H04N 1/04; G06K 15/16

USPC ................................................ 358/1.13, 1.15
See application file for complete search history.

(56) References Cited

U.S. PATENT DOCUMENTS

| 7,350,902 B2 | 4/2008 | Dietl et al. | |
|---|---|---|---|
| 2007/0076268 A1* | 4/2007 | Shojo et al. | 358/474 |
| 2012/0038940 A1* | 2/2012 | Boskovic | 358/1.13 |
| 2012/0194859 A1* | 8/2012 | Oda | 358/1.15 |

OTHER PUBLICATIONS

U.S. Appl. No. 13/482,007, filed May 29, 2012, Jimenze.

* cited by examiner

*Primary Examiner* — Qian Yang
(74) *Attorney, Agent, or Firm* — Peyton C. Watkins

(57) ABSTRACT

A multifunction printer includes a printing apparatus including: a printing device; a media advance system for advancing recording medium for printing on by the printing device; a controller for controlling the operation of the multifunction printer; an image capture platform; a lid having a closed position in which the lid covers the image capture platform, and an open position in which a front edge of the lid is raised above the image capture platform; a holder for a smart mobile device, the holder being mounted proximate the front edge of the lid; and a proximity device for identifying a particular smart mobile device that is placed in the holder.

14 Claims, 14 Drawing Sheets

SMART MOBILE DEVICE HOLDER ON MULTIFUNCTION PRINTER

FIELD OF THE INVENTION

The present invention relates generally to a multifunction printer having a holder for a smart mobile device, and more particularly to uses of the smart mobile device for both image capture and control of the multifunction printer.

BACKGROUND OF THE INVENTION

A multifunction printer includes a printing apparatus and an image capture apparatus, such as an optical scanner for scanning or copying. Conventional optical scanners operate by imaging an object (e.g. a document) with a light source, and sensing a resultant light signal with an optical sensor array. A document or other object to be scanned is placed on top of a transparent platen below on which the scanning optical sensor array, light source and optics are mounted. Each optical sensor or photoreceptor in the array generates a data signal representative of the intensity of light impinged thereon for a corresponding portion of the imaged object. The data signals from the array sensors are then processed (typically digitized) and stored in a temporary memory for subsequent manipulation and display or for printing on the associated printing apparatus in the multifunction printer. The image of the scanned object is projected onto the optical photosensor array incrementally by use of a moving scan line. The moving scan line is produced either by moving the document with respect to the scanner optical assembly, or by moving the scanner optical assembly relative to the document.

An alternative method of capturing an image in a multifunction printer is to use a digital camera. The two dimensional photosensor array of a digital camera typically has many more photoreceptors than a linear photosensor array for a conventional optical scanner, which helps speed up image capture. However, in order to acquire an image the size of a typical document, it can be necessary to mount the camera at a distance of several inches to a foot away from the platen, whether the camera is above the platen or below the platen. This can add undesirably to the height of the multifunction printer. Compact multifunction printers are preferred to reduce shipping cost as well as to take up less space.

A recent trend is for multifunction printers to be configured such that they can print images or other documents sent wirelessly by smart mobile devices such as smart phones or tablets. The smart phone needs to be network connected to a particular printer in order to send images to it. Smart mobile devices also include a camera as well a display and a processor.

Two of the more expensive subsystems of a multifunction printer are the scanning apparatus and the control panel. What is needed is a multifunction printer having a low cost and user friendly way to associate a smart mobile device with it, such that the smart mobile device can take over such functions as image capture and user interface.

SUMMARY OF THE INVENTION

A multifunction printer includes a printing apparatus including: a printing device; a media advance system for advancing recording medium for printing on by the printing device; a controller for controlling the operation of the multifunction printer; an image capture platform; a lid having a closed position in which the lid covers the image capture platform, and an open position in which a front edge of the lid is raised above the image capture platform; a holder for a smart mobile device, the holder being mounted proximate the front edge of the lid; and a proximity device for identifying a particular smart mobile device that is placed in the holder.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
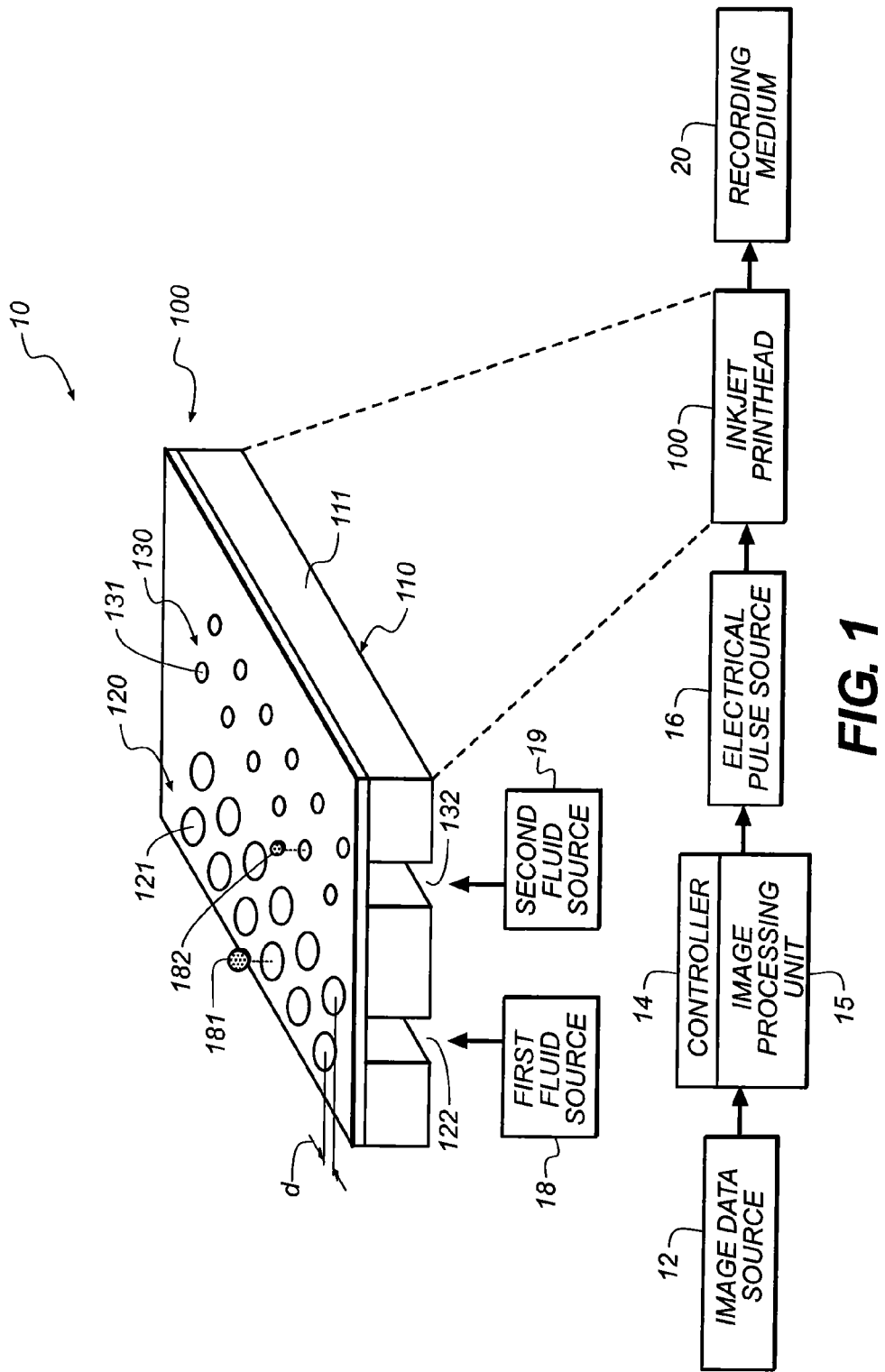
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays 120, 130 has two staggered rows of nozzles 121, 131, each row having a nozzle density of 600 per inch. The effective nozzle density then in each nozzle array 120, 130 is 1200 per inch (i.e. d=1/1200 inch in FIG. 1). If pixels on the recording medium 20 were sequentially numbered along the paper advance direction, the nozzles 121, 131 from one row of the nozzle arrays 120, 130 would print the odd numbered pixels, while the nozzles 121, 131 from the other row of the nozzle arrays 120, 130 would print the even numbered pixels.

In fluid communication with each nozzle array 120, 130 is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. In FIG. 1, first fluid source 18 supplies ink to first nozzle array 120 via ink delivery pathway 122, and second fluid source 19 supplies ink to second nozzle array 130 via ink delivery pathway 132. Although distinct first and second fluid sources 18 and 19 are shown, in some applications it may be beneficial to have a single fluid source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles 121, 131 on inkjet printhead die 110 can be the same size, rather than having multiple sized nozzles 121, 131 on inkjet printhead die 110.

Not shown in FIG. 1, are the drop forming mechanisms associated with the nozzles 121, 131. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with first and second nozzle arrays 120 and 130 are also sized differently in order to optimize the drop ejection process for the different sized drops. During operation, droplets of ink are deposited on a recording medium 20.

Figure 2:
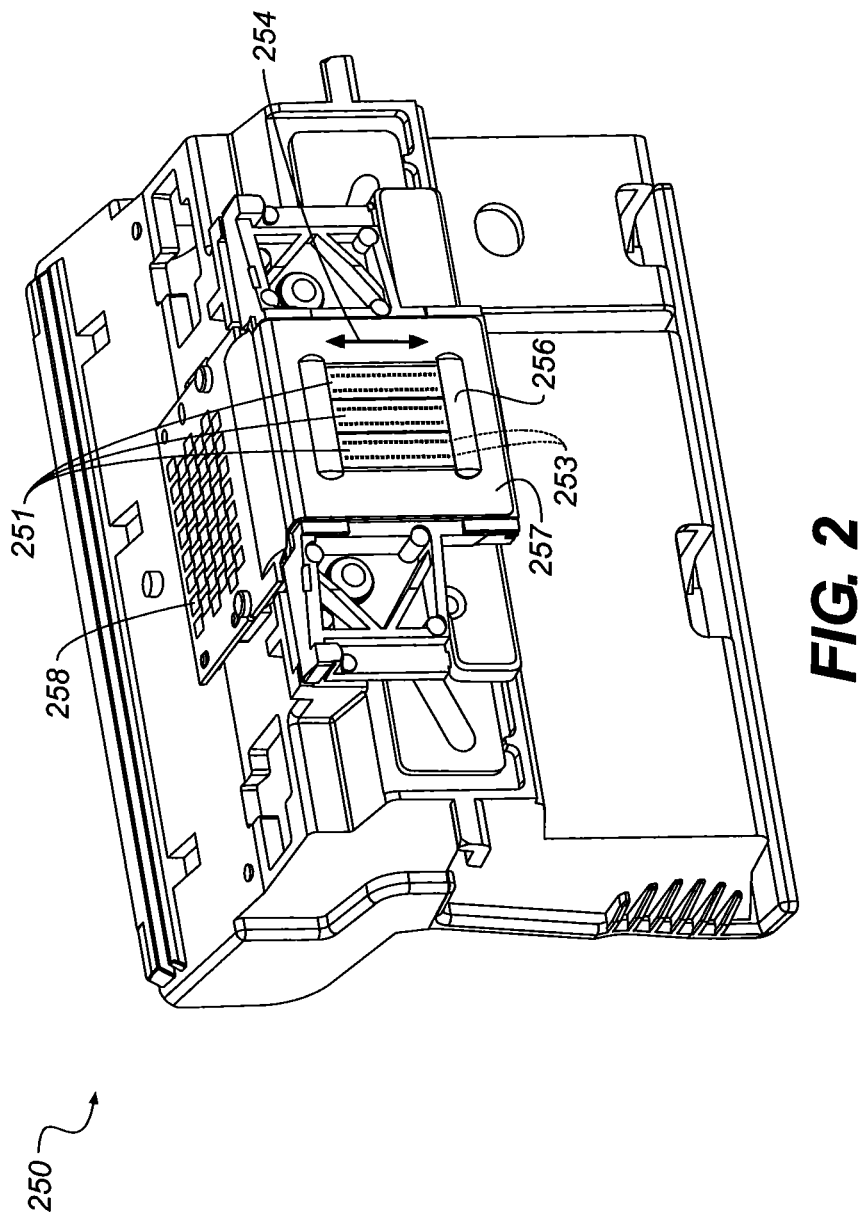
FIG. 2 is a perspective of a portion of a printhead.

FIG. 2 shows a perspective of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array 253 along the nozzle array direction 254 is typically on the order of 1 inch or less. Typical lengths of recording media 20 are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead 250 and connects to connector board 258. When printhead 250 is mounted into the carriage 200 (see FIG. 3), connector board 258 is electrically connected to a connector (not shown) on the carriage 200, so that electrical signals can be transmitted to the printhead die 251.

Figure 3:
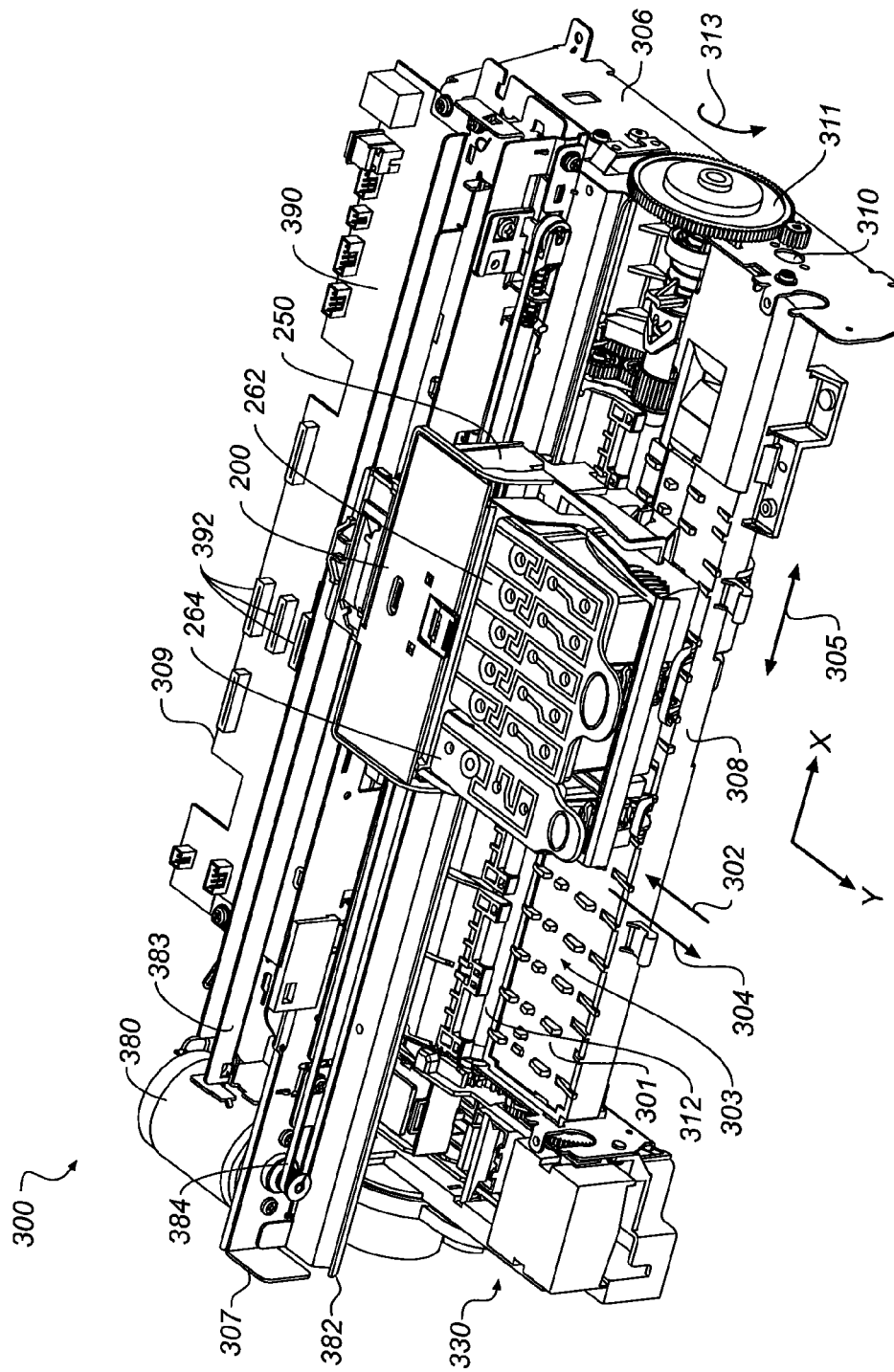
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. Printing mechanism 300 has a print region 303 across which carriage 200 is moved back and forth in carriage scan direction 305 along the X axis, between the right side 306 and the left side 307 of printing mechanism 300, while drops are ejected from printhead die 251 (not shown in FIG. 3) on printhead 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead 250 is mounted in carriage 200, and multi-chamber ink supply 262 and single-chamber ink supply 264 are mounted in the printhead 250. The mounting orientation of printhead 250 is rotated relative to the view in FIG. 2, so that the printhead die 251 are located at the bottom side of printhead 250, the droplets of ink being ejected downward onto the recording medium 20 in print region 303 in the view of FIG. 3. Multi-chamber ink supply 262, in this example, contains five ink sources: cyan, magenta, yellow, photo black, and colorless protective fluid; while single-chamber ink supply 264 contains the ink source for text black. Paper or other recording medium 20 (sometimes generically referred to as paper or media herein) is loaded along paper load entry direction 302 toward the front of printing mechanism 308.

Figure 4:
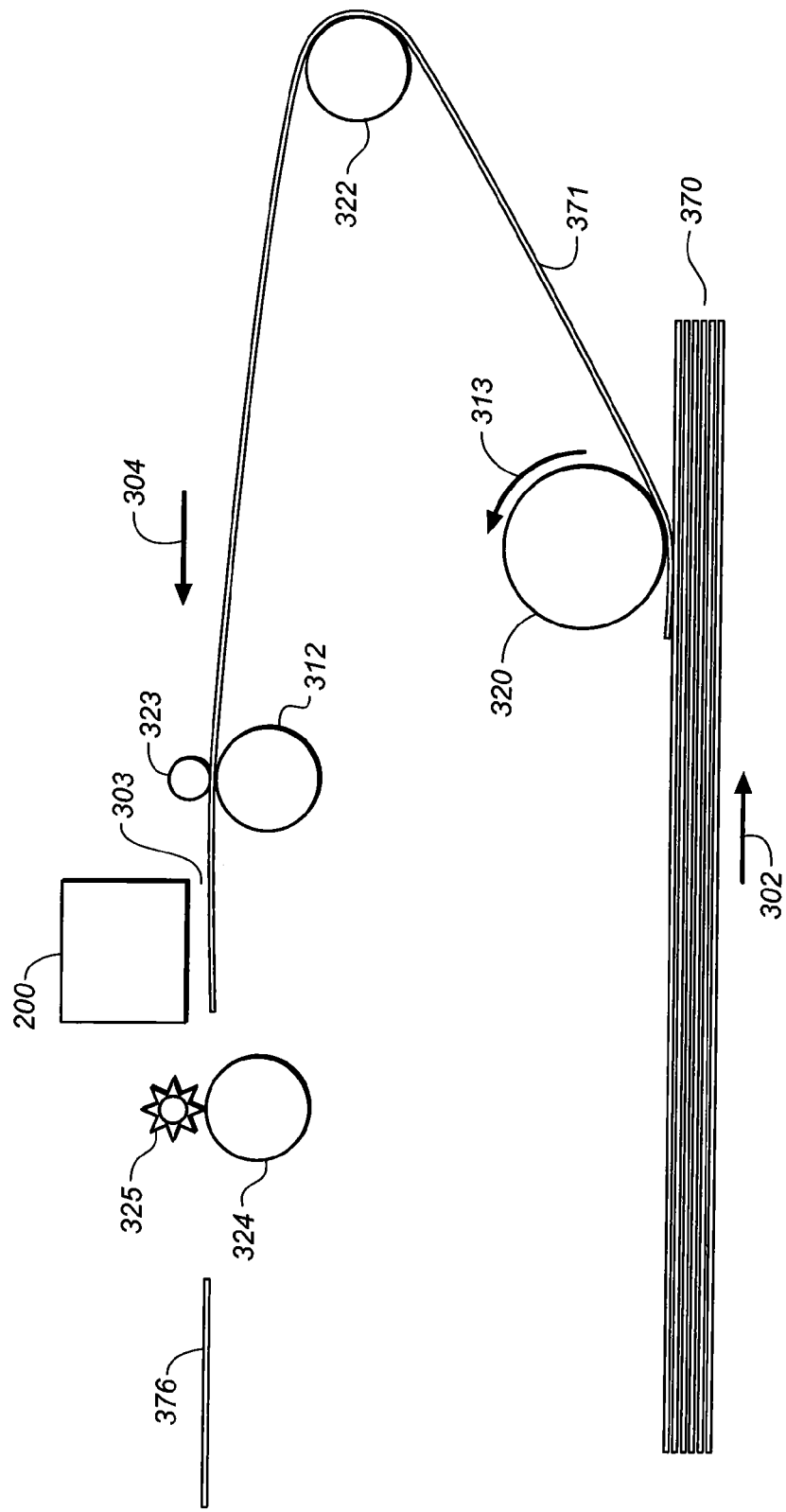
FIG. 4 is a schematic side view of an exemplary paper path in a carriage printer.

A variety of rollers are used to advance the recording medium 20 through the printer as shown schematically in the side view of FIG. 4. In this example, a pick-up roller 320 moves the top piece or sheet 371 of a stack 370 of paper or other recording medium 20 in the direction of arrow, paper load entry direction 302. A turn roller 322 acts to move the paper around a C-shaped path (in cooperation with a curved rear wall surface) so that the paper continues to advance along media advance direction 304 from the rear 309 of the printing mechanism (with reference also to FIG. 3). The paper is then moved by feed roller 312 and idler roller(s) 323 to advance along the Y axis across print region 303, and from there to a discharge roller 324 and star wheel(s) 325 so that printed paper exits along media advance direction 304 to media output holder 376. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 at the right side of the printing mechanism 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printing mechanism 307, in the example of FIG. 3, is the maintenance station 330.

Toward the rear of the printing mechanism 309, in this example, is located the electronics board 390, which includes cable connectors 392 for communicating via cables (not shown) to the printhead carriage 200 and from there to the printhead 250. Also on the electronics board 390 are typically mounted motor controllers for the carriage motor 380 and for the paper advance motor, a clock for measuring elapsed time, a processor and other control electronics (shown schematically as controller 14 and image processing unit 15 in FIG. 1) for controlling the printing process, and an optional connector for a cable to a host computer.

Figure 5:
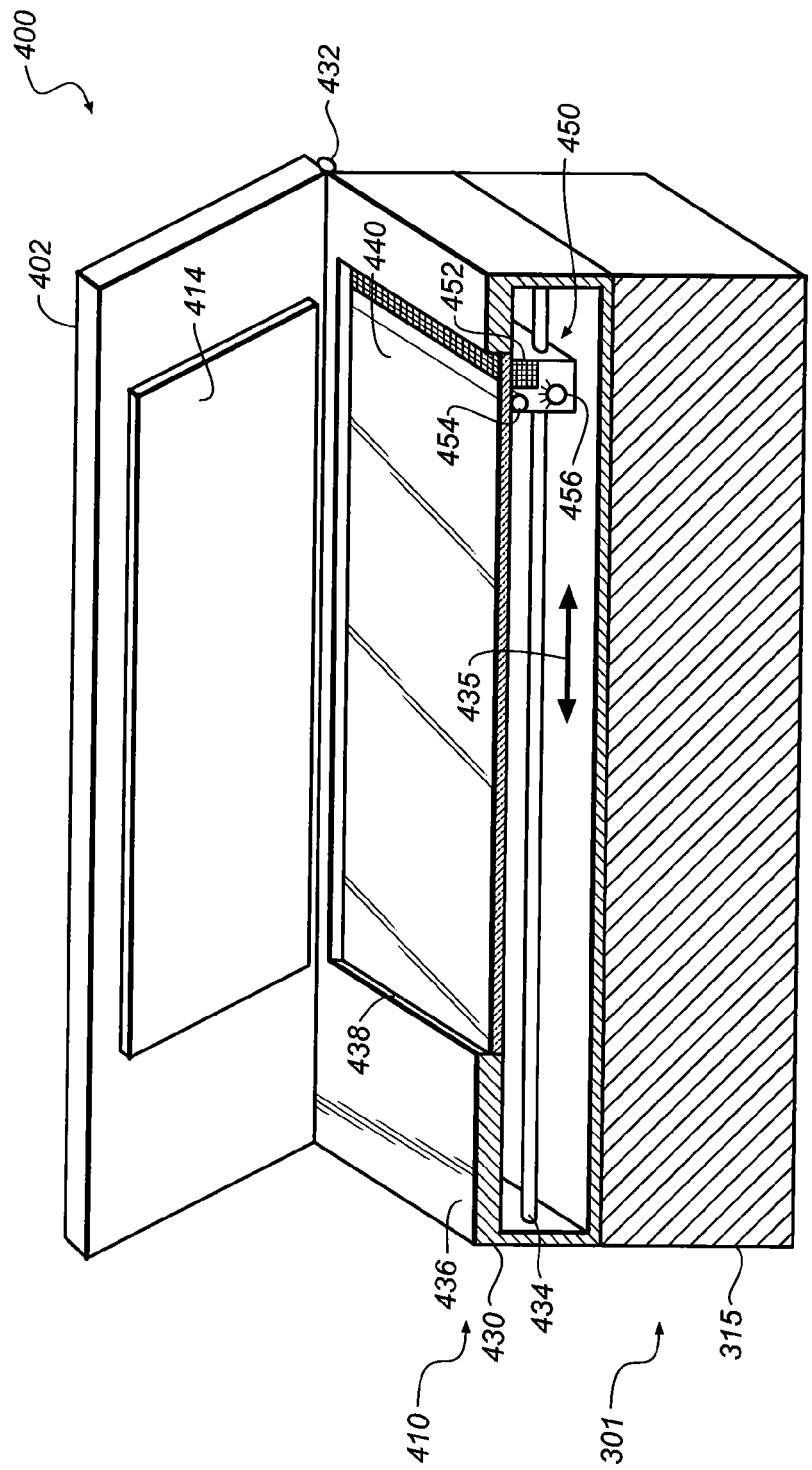
FIG. 5 is a perspective of a multifunction printer having a conventional prior art scanning apparatus.

FIG. 5 shows a perspective of a multifunction printer 400 having a printing apparatus 301 including a printing mechanism for printing images, such as printing mechanism 300 (FIG. 3), enclosed within a housing 315, and also a prior art scanning apparatus 410 for scanning documents or other items. In this view, the front portion of scanning apparatus 410 is cut away in order to show internal features of the scanning apparatus more clearly. Multifunction printer 400 can do printing, scanning of documents, or copying of documents (i.e. printing plus scanning).

Prior art scanning apparatus 410 includes scanning apparatus body 430 and lid 402, which is pivotably attached to scanning apparatus body 430 by hinge 432. The surface of scanning apparatus body 430 that is covered by lid 402 when lid 402 is closed includes a frame 436. Transparent platen 440 (typically a flat piece of glass) is inset within the frame 436. In the example shown in FIG. 5, the surface of the transparent platen 440 is lower than the surface of frame 436 so that there is an offset 438. Transparent platen 440 is not covered by lid 402 when the lid 402 is open as it is in FIG. 5.

Below transparent platen 440 is movable sensor array module 450. In the example shown in FIG. 5, sensor array module 450 includes a photosensor array (such as a contact image sensor) 452 extending the width of the transparent platen 440, a roller 454 that is biased into contact with the underside of the transparent platen 440, and a light source 456 that illuminates a scan line of a document or other item (not shown) that is placed on top of transparent platen 440. A light guide and other optics (not shown) can also be included in sensor array module 450. Sensor array module 450 is moved back and forth along scanning guide 434 in scanning direction 435 across the length of transparent platen 440 in order to scan the document or other item, receiving reflected light from the item through the transparent platen 440 scan line by scan line and converting the reflected light into electrical signals. A controller (not shown) converts the electrical signals into digitized data to form a digitized image of the item. Scanning guide 434 can be a round rail, a rack and pinion or other guiding member that can use the power of a motor (not shown) to provide a linear motion along the scanning direction 435.

In the example shown in FIG. 5, lid 402 includes a reflective backing plate 414. The thickness of reflective backing plate 414 is accommodated in offset 438 between frame 436 and the top surface of transparent platen 440 when scanner lid 402 is closed. Reflective backing plate 414 can be resiliently mounted on lid 402, so that reflective backing plate 414 is effective in pressing documents of various thicknesses against transparent platen 440. Typically reflective backing plate 414 is white in the document scanning region. In some scanning apparatus configurations (not shown), the reflective backing function is integrated into lid 402.

Figure 6:
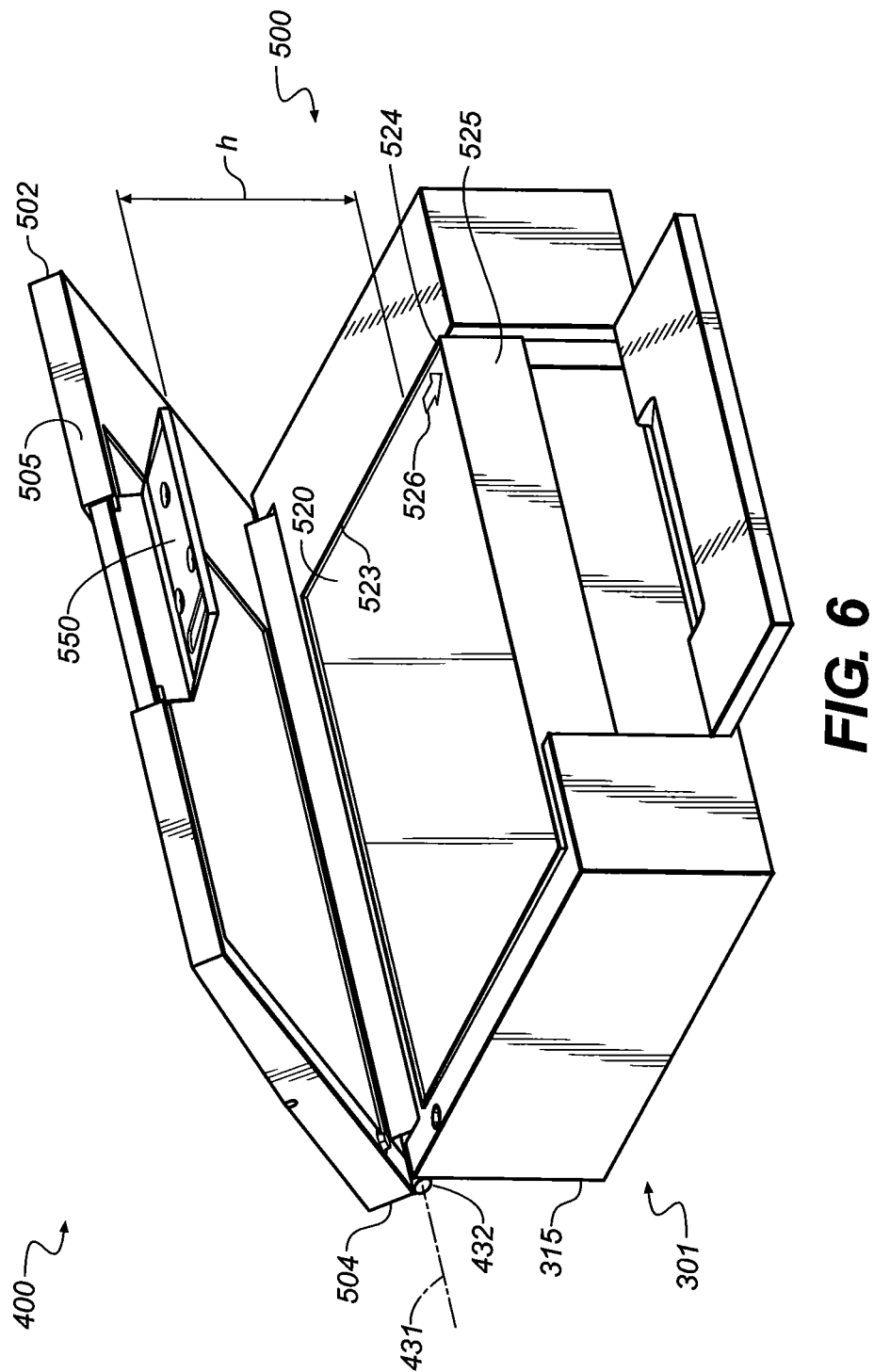
FIG. 6 is a perspective of a multifunction printer having a holder for a smart mobile device according to an embodiment of the invention.

FIG. 6 shows a perspective of a multifunction printer 400, according to an embodiment of the invention, in which image capture apparatus 500 replaces the prior art scanning apparatus 410 shown in FIG. 5. Image capture apparatus 500 has some similarities in appearance to prior art scanning apparatus 410, including a lid 502 that opens and closes. However, the scanning components below transparent platen 440 in FIG. 5 are replaced by a camera 565 (FIG. 7) on a camera side 566 of a detachable smart mobile device 560 (FIG. 7) that is held in holder 550 mounted near a front edge 505 of lid 502. Transparent platen 440 of FIG. 5 is replaced by image capture platform 520 (typically opaque) in the embodiment shown in FIG. 6. The term "smart mobile device" as used herein, is meant to include devices such as smart phones, tablets and other such wireless communication devices. Typical attributes of smart mobile devices are that they are wirelessly connected (for example by Wi-Fi, 3G, 4G or the like), capable of voice communication, have a built-in camera, and capable of browsing the interne. Rather than having a sensor array module 450 (FIG. 5) that moves below a transparent platen 440 (FIG. 5) as in prior art scanning apparatus 410 (FIG. 5) to scan a document or other object while looking up at it (so that the document should be placed on transparent platform 440 image side down), the image capture apparatus 500 of the embodiment of FIG. 6 includes the camera 566 of smart mobile device 560 (FIG. 7) that is stationary during image capture and looks down at the document or other object so that a document should be placed on image capture platform 520 with image side up. A frame 525 having a lip 523 that extends above the image capture platform 520 can surround image capture platform 520. Frame 525 can help define where the document or object is to be placed. For example, a document can be aligned against lip 523 at corner 524 of frame 525. In addition to lip 523 at corner 524, an additional type of alignment feature is marker 526.

Figure 7:
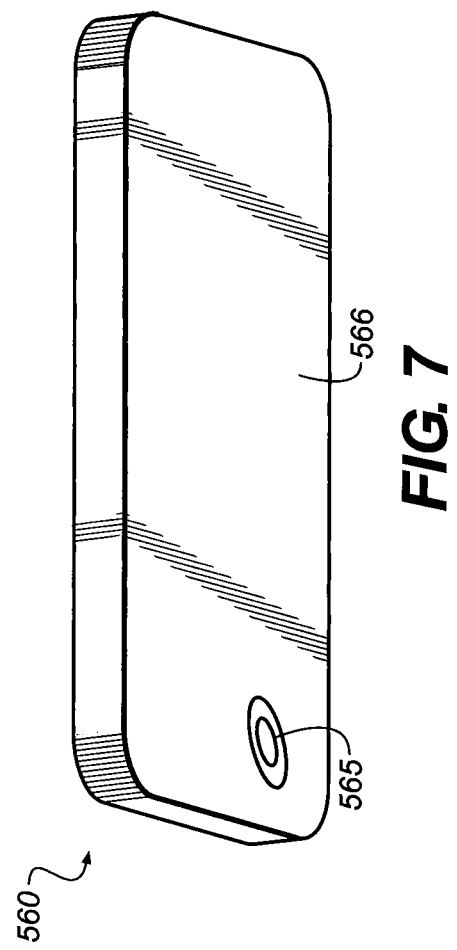
FIG. 7 is a perspective of a camera side of a smart mobile device.

Lid 502 is pivotably attached to housing 315 by hinge 432 having an axis 431. Hinge 432 is located near a rear edge 504 of lid 502. Lid 502 has a closed position (see FIG. 11) in which lid 502 covers the image capture platform 520, and an open position (FIG. 6) in which front edge 505 of lid 502 is raised above the image capture platform 520. In the embodiment shown in FIG. 6, holder 550 is pivotable relative to lid 502 about a holder hinge 559 (FIG. 9) having an axis 558 that is parallel to axis 431 of hinge 432, so that holder 550 remains in a substantially horizontal position as lid 502 is raised different amounts. When lid 502 is raised by different amounts, holder 550 is raised to different heights h above image capture platform 520, and is positioned directly above different portions of image capture platform 520. For example, in FIG. 6 lid 502 is raised to a partially open position, while in FIG. 8, lid 502 is raised to a fully open position. In the fully open position of lid 502 (FIG. 8), holder 550 is directly above a portion of image capture platform 520 that is near hinge 432, while in the partially open position of lid 502 shown in FIG. 6, holder 550 is directly above a portion of image capture platform 520 that is closer to the opposite side near marker 526. The extent of opening of different positions of lid 520 is one way to accommodate different focal lengths, positions, and fields of view of cameras 565 (FIG. 7) on different types of smart mobile devices 560 (FIG. 7). One or more detents (not shown) can be included in the opening mechanism of lid 502 to hold the lid 502 stably at predetermined extents of opening.

Figure 8:
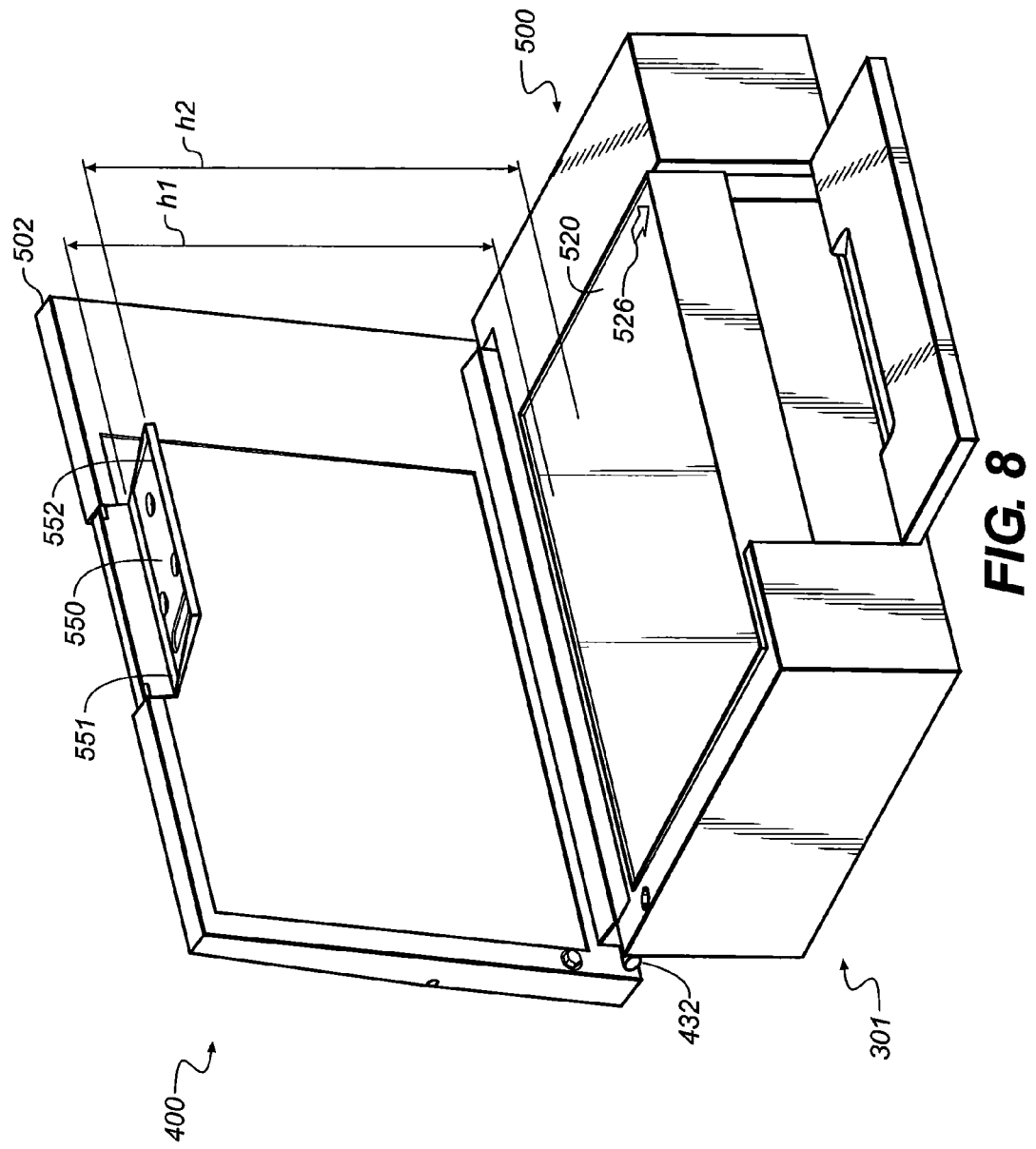
FIG. 8 is a perspective of the multifunction printer of FIG. 6 with the lid raised to a fully open position.
Figure 9:
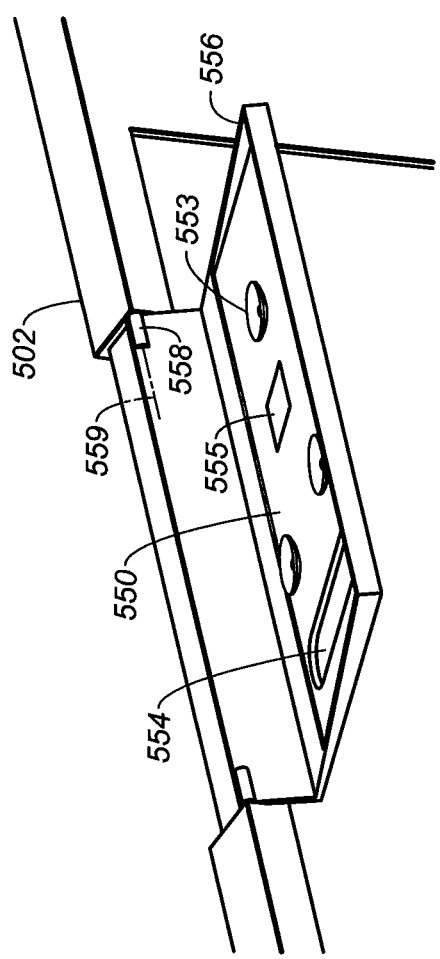
FIG. 9 is a close-up view of a portion of FIG. 8 showing the holder.

FIG. 9 is a close-up view of a portion of FIG. 8 in order to show additional details of holder 550 more clearly. Holder 550 includes a viewing port 554 through which camera 565 of smart mobile device 560 (FIG. 7) can view image capture platform 520 (FIG. 8). Viewing port 554 is made larger than camera 565 to accommodate different positions of camera 565 on different smart mobile devices 560 (FIG. 7). In order to secure smart mobile device 560, holder 550 can include one or more suction cups 553 as well as a raised edge 556. A proximity device 555, discussed in further detail below, is positioned in or near holder 550.

Figure 10:
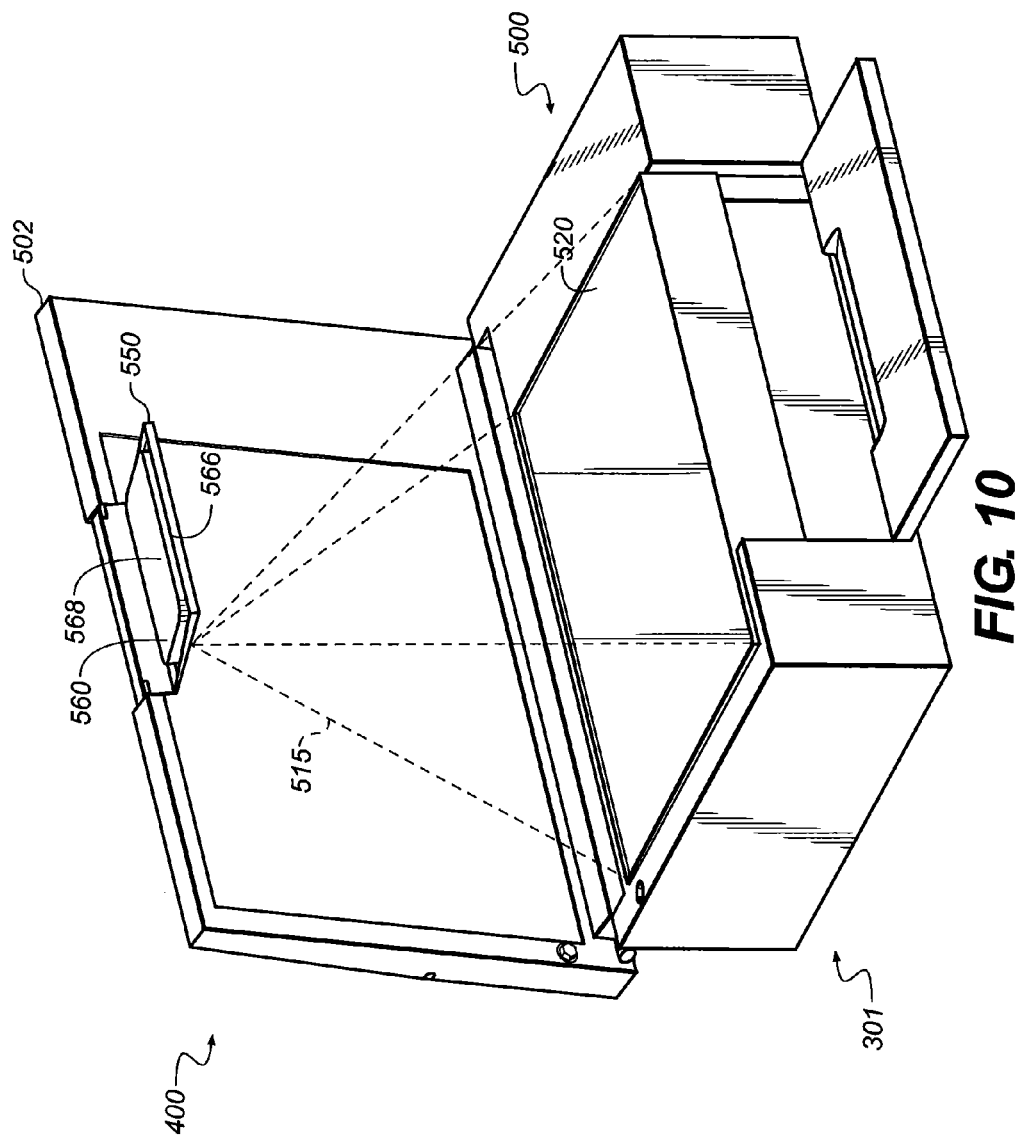
FIG. 10 is a perspective similar to FIG. 8 with a smart mobile device placed in the holder.

At different open positions of lid 502, holder 550 can require fine adjustment of pivoting about axis 558 of holder hinge 559 so that image capture platform 520 is properly in the field of view of camera 565 of smart mobile device 560. For example, with reference to the fully open position shown in FIGS. 8 and 10, since holder 550 is positioned directly above a portion of image capture platform 520 that is offset toward the side near hinge 432, it can be advantageous to tilt holder 550 slightly upward so that a first holding portion 551 near lid 502 is located at a first height h1 above image capture platform 520 and a second holding portion 552 farther from lid 502 is located at a second height h2 greater than h1. In this way, the field of view (represented by dashed lines 515 in FIG. 10) of camera 565 (FIG. 7) includes all or substantially all of the entire image capture platform 520. A keystone correction software application can be used by smart mobile device 560 to correct for image distortion when the camera 565 is not held parallel to the image capture platform 520. Other software applications can be used by smart mobile device to improve the captured image. For example, the edges of the page of the captured document can be detected and the image can be trimmed to include only the document itself. In FIG. 10, camera side 566 (FIG. 7) of smart mobile device 560 faces down toward image capture platform 520, while display side 568 faces upward away from image capture platform 520. Further types of adjustability can be included in the mount of holder 550. For example, a rack and pinion (not shown) can be used to further adjust the height of holder 550 relative to lid 502 when lid 502 is an in open position such as that shown in FIG. 6 or FIG. 8 in order to accommodate different focal lengths of different cameras 565 on different smart mobile devices 560. In addition, a pivoting mechanism including lever arms, linkages, pulleys, belts, gears or shafts can be used to connect the pivoting of the holder 550 to the opening of the lid 502 for properly orienting of the field of view in a similar fashion to those described in U.S. patent application Ser. No. 13/482,007, entitled, Camera on Multifunction Printer by Juan M. Jimenez, filed May 29, 2012.

Figure 11:
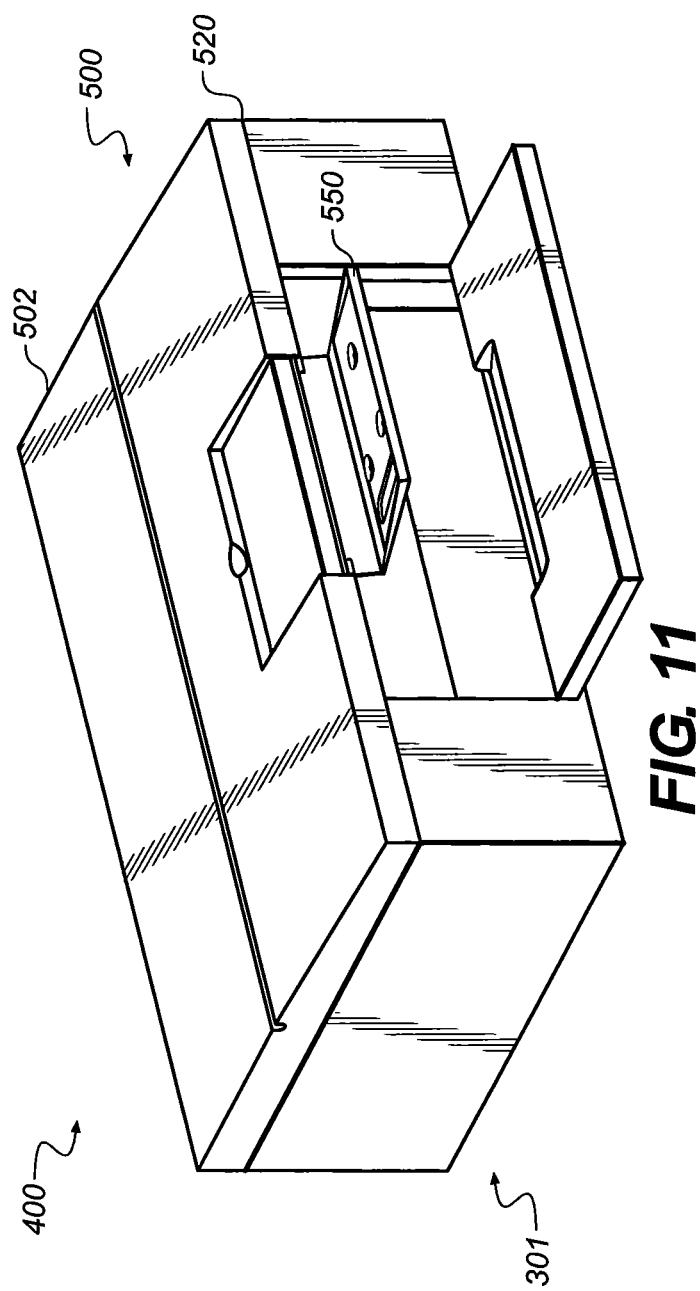
FIG. 11 is a perspective of the multifunction printer of FIG. 6 with the lid closed.
Figure 12:
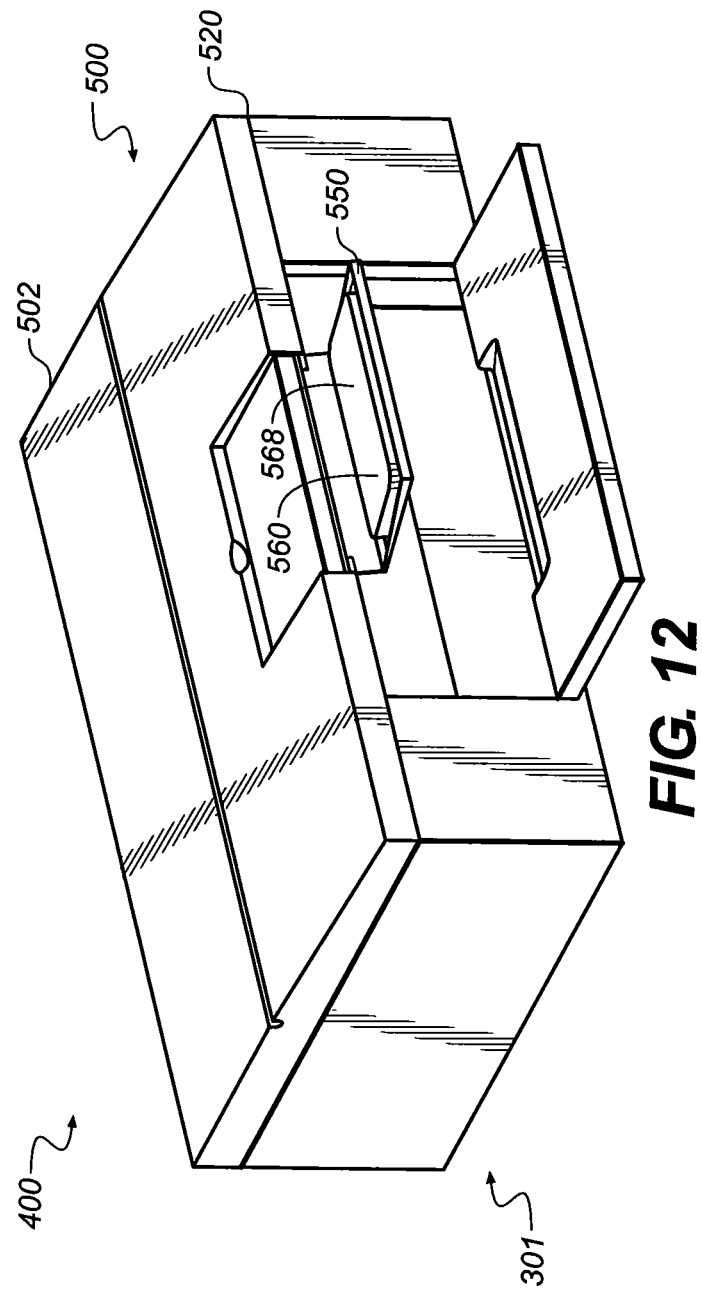
FIG. 12 is a perspective similar to FIG. 11 with a smart mobile device placed in the holder.

FIGS. 11 and 12 show perspectives of multifunction printer 400 with lid 502 in a closed position so that it covers image capture platform 520. Holder 550 continues to be in a substantially horizontal position, just as it was in FIG. 6 with lid 502 partly open, and in FIG. 8 with the lid 502 fully open. Since image capture platform 520 is in a substantially horizontal plane when multifunction printer 400 is in its operating position, and since lid 502 is substantially perpendicular to image capture platform 520 when it is in its fully open position (FIG. 8), it can be said that holder 550 is configured to be substantially parallel to lid 502 when lid 502 is closed (FIG. 11), and substantially perpendicular to lid 502 when lid 502 is raised to a fully open position (FIG. 8). FIG. 12 is similar to FIG. 11, but also shows a smart mobile device 560 mounted on holder 550 with the display side 568 of smart mobile device 560 facing upward. In such an orientation, smart mobile device 560 can conveniently be used as a user interface (or control panel) for multifunction printer 400. Although in some embodiments, multifunction printer 400 can include its own control panel (not shown), in other embodiments, a low cost multifunction printer 400 can be made without its own control panel, relying on smart mobile device 560 as a user interface.

With reference again to FIG. 9, in order to reliably and easily establish network connection between multifunction printer 400 and a particular smart mobile device 560 that can perform image capture, transfer files to multifunction printer 400, and optionally function as a user interface to multifunction printer 400, it is advantageous to provide a proximity device 555 in or near holder 550. Proximity device 555 can use near field communication, for example, to establish a link using a compatible proximity device 569 (FIG. 13) in the smart mobile device 560. Near field communication includes a set of short-range wireless technologies operating around 14 MHz, and typically requiring a distance of 4 cm or less. An initiator actively generates a radio frequency field that can power a passive target. This enables targets to take very simple forms such as tags or stickers that do not require batteries. Peer-to-peer communication is possible, in embodiments where both devices (proximity device 555 and the compatible proximity device 569 in the smart mobile device 560) are powered. Instead of performing manual configurations to identify devices to be connected, the identification and connection between two devices using near field communication is automatically established in a fraction of a second. Thus when a smart mobile device 560 is placed in holder 550, it is within the 4 cm range and is identified as the particular smart mobile device 560 that is in holder 550 and is to be wirelessly connected to multifunction printer 400.

Figure 13:
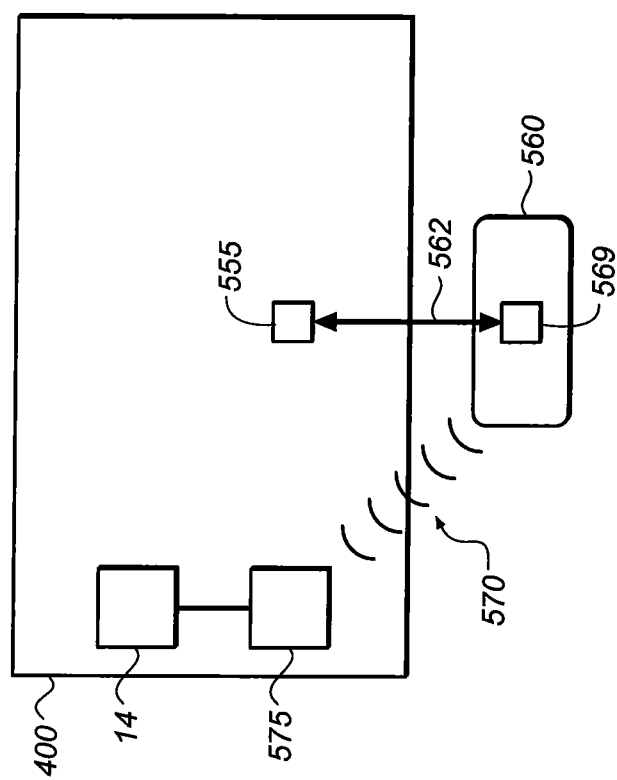
FIG. 13 shows a block diagram of a smart mobile device in direct wireless communication with a multifunction printer.

FIG. 13 shows a block diagram of a smart mobile device 560 in direct wireless communication with multifunction printer 400. In the figure, smart mobile device 560 is shown as physically separated from multifunction printer 400 (although it is actually held in holder 555) in order to show more clearly the wireless connection 570 between smart mobile device 560 and a Wi-Fi module 575 in multifunction printer 400, as well as the link 562 between proximity device 555 and a compatible proximity device 569 in smart mobile device 560. Wi-Fi module 575 is connected to controller 14 of multifunction printer 400. Typically a smart mobile device 560 can send image data having formats such as JPEG directly to multifunction printer 400, as shown in FIG. 13 for printing. Multifunction printer 400 includes firmware (not shown) that is capable of directly receiving the image data in JPEG format as in FIG. 13 and printing it. Also, when the smart mobile device 560 is used as a control panel, simple printing instructions such as how many copies to print can be done and can be sent directly from the smart mobile device 560 and received by multifunction printer 400 as shown in FIG. 13.

Figure 14:
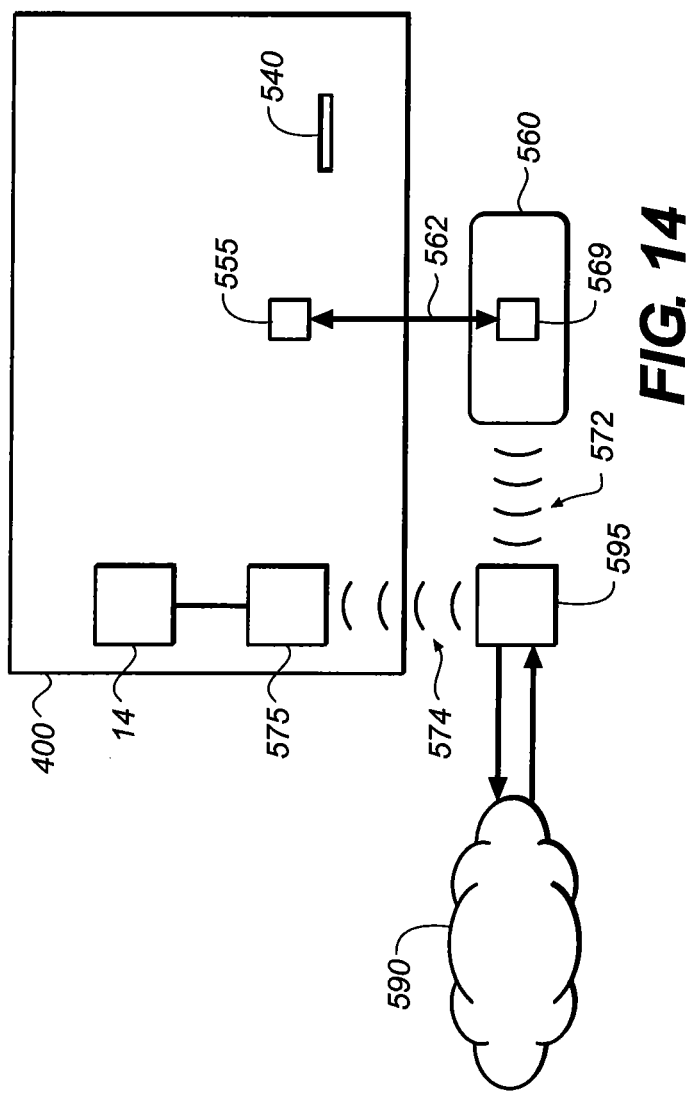
FIG. 14 shows a block diagram of a smart mobile device in wireless communication with a multifunction printer through the cloud via a router.

FIG. 14 shows a block diagram of smart mobile device 560 in wireless communication with multifunction printer 400 through cloud 590 via an access point such as a router 595. Cloud 590 is meant herein to refer to computing resources delivered over a network. With regard to image data, although multifunction printer 400 can handle formats such as JPEG directly, it cannot independently process more complex formats, such as WORD files. Typically a print driver (not shown) is loaded onto a host computer (not shown) for printing files of various types. However, a smart mobile device 560 typically does not include such a print driver for multifunction printer 400. Therefore, for more complex image data formats, smart mobile device 560 sends the image file by wireless connection 572 to router 595 which is then sent to cloud 590 for processing into a format that is compatible with multifunction printer 400. The processed data is sent back from cloud 590 to router 595 and from router 595 to Wi-Fi module 575 by wireless connection 574. Multifunction printer 400 is also configured to receive printing instructions from smart mobile device 560 through computing resources delivered over a network (i.e. sent to cloud 590). For example, if the user has a WORD document on a flash drive (not shown), he can insert it into a USB port 540 of multifunction printer 400. Smart mobile device 560 can be used to initiate the print, but the printing instructions and file conversion can be processed via cloud 590.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
250 Printhead
251 Printhead die
253 Nozzle array
254 Nozzle array direction
256 Encapsulant
257 Flex circuit
258 Connector board
262 Multi-chamber ink supply
264 Single-chamber ink supply
300 Printing mechanism
301 Printing apparatus
302 Paper load entry direction
303 Print region
304 Media advance direction
305 Carriage scan direction
306 Right side of printing mechanism
307 Left side of printing mechanism
308 Front of printing mechanism
309 Rear of printing mechanism
310 Hole (for paper advance motor drive gear)
311 Feed roller gear
312 Feed roller
313 Forward rotation direction (of feed roller)
315 Housing
320 Pick-up roller
322 Turn roller
323 Idler roller
324 Discharge roller
325 Star wheel(s)
330 Maintenance station
344 Display
370 Stack of media
371 Sheet
376 Media output holder
380 Carriage motor
382 Carriage guide rail
383 Encoder fence
384 Belt
390 Printer electronics board
392 Cable connectors
400 Multifunction printer
402 Lid
410 Scanning apparatus
414 Reflective backing plate
430 Body (of scanning apparatus)
431 Axis of hinge
432 Hinge
434 Scanning guide
435 Scanning direction
436 Frame
438 Offset
440 Transparent platen
450 Sensor array module
452 Photosensor array
454 Roller
456 Light source
500 Image capture apparatus
502 Lid
504 Rear edge
505 Front edge
515 Dashed line (field of view indicator)
520 Image capture platform
523 Lip
524 Corner
525 Frame
526 Marker
540 USB port
550 Holder
551 First holding portion
552 Second holding portion
553 Suction cup(s)
554 Viewing port
555 Proximity device
556 Raised Edge
558 Axis
559 Holder hinge
560 Smart mobile device
562 Link
565 Camera
566 Camera side
568 Display side
569 Proximity device
570 Wireless connection
572 Wireless connection
574 Wireless connection
575 Wi-Fi module
590 Cloud
595 Router
h1 First height
h2 Second height
d density

The invention claimed is:
1. A multifunction printer comprising:
   a printing apparatus including:
      a printing device;
      a media advance system for advancing recording medium for printing on by the printing device;
   a controller for controlling the operation of the multifunction printer;
   an image capture platform;
   a lid having a closed position in which the lid covers the image capture platform, and an open position in which a front edge of the lid is raised above the image capture platform;
   a holder for a smart mobile device, the holder being mounted proximate the front edge of the lid; and a proximity device for identifying a particular smart mobile device that is placed in the holder, wherein the proximity device of the multifunction printer is configured to interact with a compatible proximity device included in the smart phone mobile device using near field wireless radio frequency communication over a range of 4 centimeters or less.

2. The multifunction printer of claim 1, wherein the lid and holder are configured such that a camera of the smart mobile device has a field of view that includes the image capture platform when the lid is raised to an open position.

3. The multifunction printer of claim 1, the holder having a first holding portion proximate the lid and a second holding portion distal to the lid, wherein the second holding portion is located at a greater distance above the image capture platform than the second holding portion when the lid is raised to a fully open position.

4. The multifunction printer of claim 1, wherein a height of the holder above the image capture platform is adjustable when the lid is raised to an open position.

5. The multifunction printer of claim 1, wherein the multifunction printer is configured to receive image data from the identified smart mobile device in the holder.

6. The multifunction printer of claim 5, wherein the multifunction printer is configured to receive image data directly from the identified smart mobile device.

7. The multifunction printer of claim 5, wherein the multifunction printer is configured to receive image data from the identified smart mobile device through computing resources delivered over a network.

8. The multifunction printer of claim 1, wherein the multifunction printer is configured to receive printing instructions from the identified smart mobile device in the holder.

9. The multifunction printer of claim 1, wherein the multifunction printer is configured to receive printing instructions directly from the identified smart mobile device.

10. The multifunction printer of claim 1, wherein the multifunction printer is configured to receive printing instructions from the identified smart mobile device through computing resources delivered over a network.

11. The multifunction printer of claim 1, further comprising a Wi-Fi module.

12. The multifunction printer of claim 1, wherein the holder is pivotable relative to the lid.

13. The multifunction printer of claim 1, wherein the holder is configured to be substantially parallel to the lid the when the lid is closed and substantially perpendicular to the lid when the lid is raised to a fully open position.

14. The multifunction printer of claim 1, wherein the near field communication device is proximate the holder.

* * * * *